United States Patent [19]

Shoji

[11] 4,422,141
[45] Dec. 20, 1983

[54] MICROPROCESSOR ARCHITECTURE FOR IMPROVED CHIP TESTABILITY

[75] Inventor: Masakazu Shoji, Warren, N.J.

[73] Assignee: Bell Telephone Laboratories, Incorporated, Murray Hill, N.J.

[21] Appl. No.: 61,741

[22] Filed: Jul. 30, 1979

[51] Int. Cl.³ .......................... G06F 3/00; G06F 11/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,585,599 | 7/1971 | Hitt et al. | 364/200 |
| 3,825,901 | 7/1974 | Golnek, Sr. et al. | 364/200 |
| 4,128,873 | 12/1978 | Lamiaux | 364/200 |
| 4,130,869 | 12/1978 | Kinoshita et al. | 364/200 |
| 4,167,780 | 9/1979 | Hayashi | 364/200 |

Primary Examiner—Gareth D. Shaw
Assistant Examiner—John G. Mills
Attorney, Agent, or Firm—David I. Caplan

[57] ABSTRACT

An improved architecture for a single chip microprocessor CPU includes provision for directly observing at its terminals the control signals from its instruction decoder to facilitate functional testing of the chip. The CPU, upon receiving a command signal transfers the signals on the control lines of its instruction decoder to its output terminals. In one embodiment of the invention the command signal is applied to the CPU chip at a designated input terminal. In another embodiment, the command signal is applied through a special instruction. The improvements permit increased functional test fault coverage and shorter test programs.

6 Claims, 5 Drawing Figures

MICROPROCESSOR ARCHITECTURE FOR IMPROVED CHIP TESTABILITY

BACKGROUND OF THE INVENTION

This invention relates to an improvement in microprocessor architecture and more particularly to a single chip microprocessor central processing unit (CPU) in which the control signals from the instruction decoder may be directly observed at the terminals of the chip during testing.

Microprocessor CPUs which are fabricated on a single integrated circuit chip are known in the art. Such CPU chips are designed to execute a program of instructions and typically include a plurality of input terminals, a plurality of output terminals, instruction decoding means for receiving at least a portion of an instruction during an instruction cycle and for controlling the performance of one or more processor operations specified by the instruction, the instruction decoding means having a multiplicity of control lines for providing during the instruction cycle control signals corresponding to the one or more processor operations specified by the instruction. The input and output terminals may be bonding pads on the chip or package pins in the case of a packaged chip. The instruction decoding means may be a programmable logic array (PLA) or a microprogrammed random logic controller.

One problem with the prior art microprocessor CPU is the difficulty in performing functional tests on the CPU chip. Unlike the case of a CPU in a minicomputer or a mainframe computer, the functional parts of a single chip CPU such as the instruction decoder cannot be separately tested. This is because the internal nodes of an integrated circuit chip are not, as a practical matter, accessible for testing. Functional tests on single chip CPUs are generally performed by applying a sequence of binary logic level patterns called test vectors to the input terminals of the chip and by observing the sequence of binary logic level patterns called output patterns appearing at the output terminals of the chip in response to the applied test vectors. The observed output patterns are compared with the "correct" output patterns as would be expected from a functioning chip. If an output pattern from a chip under test is found to disagree with the "correct" output pattern, the chip has one or more logical faults in one or more of its functional parts. Functional testing which is used to detect logical faults in an integrated circuit is an important step in the manufacturing process for the chip. The sequence of test vectors is normally applied to the chip by automatic testing equipment.

In addition to detecting faulty chips, functional testing may also provide information concerning the identification of those functional parts having logical faults as well as the nature of the logical faults. Such information is useful for diagnosing design problems in a newly designed CPU chip. A sequence of test vectors which is to be used for diagnostics is normally designed, not only to produce specific output patterns as a result of logical faults in the CPU chip but also to permit the unambiguous identification of logical faults when an output pattern indicating a fault is detected.

However, owing to the complexity of a CPU chip and the fact that its functional parts are not testable separately but only collectively as parts of a particular signal path between input and output terminals, not all logical faults which may potentially exist in the chip can be detected and not all detected logical faults can be unambiguously identified. Generally, a sequence of test vectors used for manufacture is designed to maximize the number of potential logical faults which can be detected with the sequence, whereas a diagnostic test vector sequence is designed to maximize the number of potential logical faults which can be both detected and identified with the sequence. A figure of merit for a sequence of test vectors is the percentage of all potential logical faults in the chip which are detectable with the sequence. This figure of merit is commonly referred to as the fault coverage of the sequence. For reasons discussed above it is generally not possible to achieve a 100 percent fault coverage in the functional testing of a prior art CPU chip. A CPU chip having an undetectable logical fault would pass final testing as good product, and only later be identified as a failed device during actual operation in the field. Consequently, logical faults in chips which are not detected during functional testing can make the entire chip unreliable.

I have discovered that most of the undetectable and unidentifiable potential logical faults in a prior art CPU exist in the instruction decoder which generates the control signals governing all processor operations. These control signals, which are distributed to virtually all other functional parts of the CPU, are not directly accessible for testing but may only be indirectly observed through the operation of the other functional parts which they control. Therefore, even though a logical fault in the instruction decoder causes an error in a control signal, the erroneous control signal may not always give rise to an erroneous output pattern. For example, the erroneous control signal may, in a particular test, only affect a functional part which is not in the signal path of the output pattern, or another logical fault in the signal path may give rise to a compensating error in the output pattern. In some cases, by adding more test vectors to the test program, the control signal error can be made to propagate to the output terminals, but not all potential logical faults in the instruction decoder of a prior art CPU chip can be made detectable by presently known techniques. In general, a long test program is necessary to achieve a relatively high fault coverage in the functional testing of a prior art CPU chip. In an example of a prior art CPU chip, a fault coverage of 95% is achieved with a test program having 25,000 test vectors. However, a long test program leads to a high testing cost. As CPU chips of greater complexity are designed in accordance with the prior art, the problem of a long test program becomes more serious as the testing cost may become a major part of the cost of manufacturing a microprocessor chip.

Therefore, a need clearly exists for an improved CPU architecture which would increase microprocessor chip reliability by improving the functional test fault coverage of the chip and/or which would reduce functional testing cost by permitting shorter test programs.

SUMMARY OF THE INVENTION

This invention provides an internal switching and interconnection arrangement in a CPU having an instruction decoder which decodes the instructions from an instruction register, so that the control signals emanating from the instruction decoder are sent through a tristate output driver to the input/output terminals (or pins) of the CPU in response to an external or internal command signal provided that new instructions are not then being fetched by the instruction register of the CPU. On the other hand, when new instructions are being fetched for updating the instruction register, regardless of the command signal the tristate output driver is placed in its high impedance state while input latches are activated to deliver the new instructions to the instruction register. In this manner, instructions from the instruction decoder can be furnished at the input/output terminals when desired in response to the command signal without interfering with the operations of the CPU.

DETAILED DESCRIPTION

Figure 1:
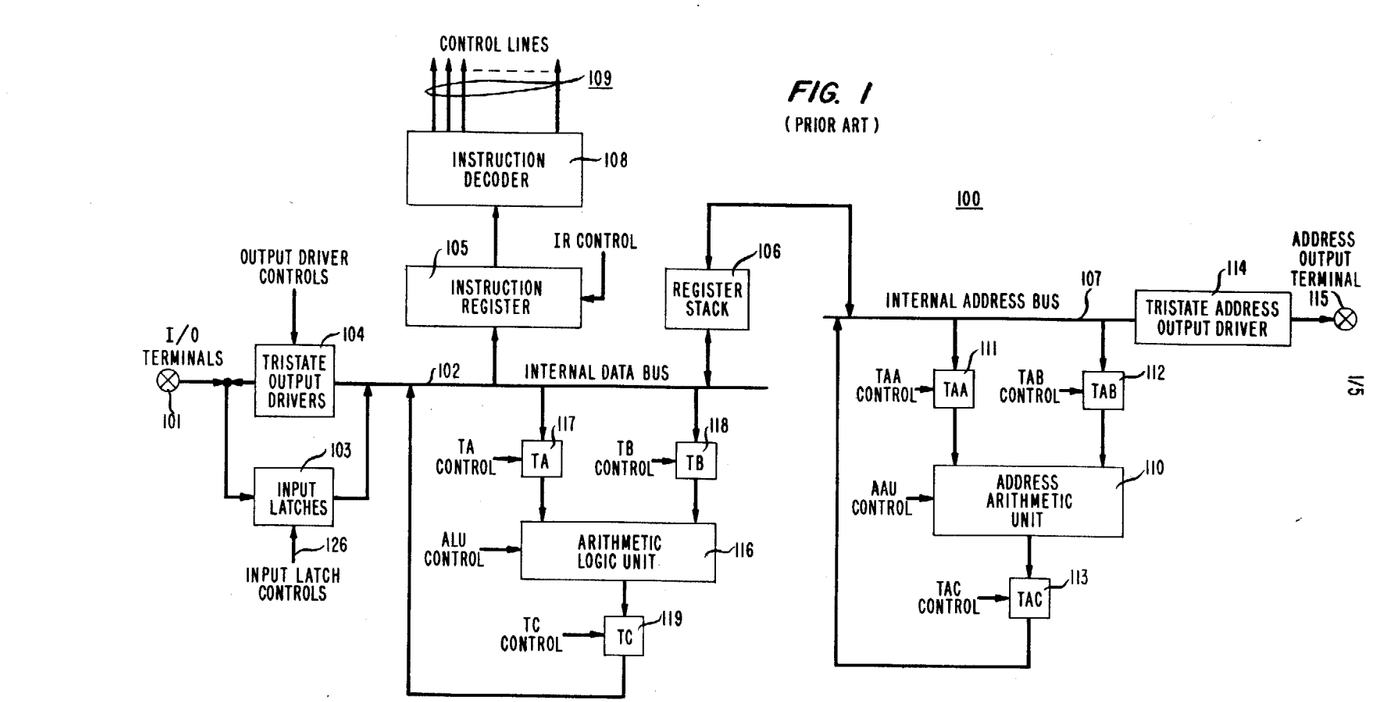
FIG. 1 is a block diagram of a typical prior art microprocessor CPU.

Referring now to FIG. 1, there is shown a block diagram of a microprocessor CPU 100 known in the prior art and designed to be fabricated on a single integrated circuit chip. Only those functional parts and terminals of the CPU which are essential for explaining its function are shown in FIG. 1. The CPU shown is designed to execute a program of binary instructions by receiving the instructions one at a time at its bidirectional input/output (I/O) terminals 101 (the bidirectional I/O terminals may serve as either input terminals or output terminals and are equivalent separate input and output terminals) and by performing one or more processor operations as specified by the instruction. Where a particular processor operation requires operands, the CPU responds to the instruction specifying that operation and provides at the address output terminals 115 the addresses of external sources for the operands. The external sources which are not shown in FIG. 1 may either be locations in a memory or peripheral input devices. An operand from an external source is provided to the CPU at the I/O terminals. If the processor operation yields resultant data which are to be stored at an external destination, those data are provided at the I/O terminals and the address of its destination is provided at the address output terminals. The external destination may either be a location in a memory or a peripheral output device.

The instruction format for the CPU consists of an op-code field which specifies the processor operation(s) to be performed, an address mode field which specifies the method for forming the source and destination addresses for data and an address field which provides address data for forming the source and destination addresses except in the "immediate data mode". For the case where the address mode field specifies the so-called "immediate data" mode, the address field carries the data itself, and no address formation is required.

The interval of time during which the CPU obtains an instruction and completes its execution is commonly referred to as the instruction cycle. The instruction cycle consists of an instruction fetch phase during which the CPU receives an instruction typically from an external memory, a data fetch phase during which the CPU forms the source and destination addresses (except for the "immediate data" mode) and retrieves one or more operands from external sources or internal registers, and a data execution phase during which one or more processor operations specified by the instruction are performed and the resultant data, if any, stored at a destination location.

During the instruction fetch phase, the CPU provides at the address output terminals an address of a location in an external memory (not shown) containing an instruction. The addressed instruction is received by the CPU at its I/O terminals. The I/O terminals are coupled to an internal data bus 102 by tristate output drivers 104 and by input latches 103. For the input mode when instructions or data are transferred from the I/O terminals to the internal data bus, the output drivers under the control of output driver control signals are in their high impedance state, while the input latches are activated by input latch control signals, on the input latch control line 126, to transfer the signals on the I/O terminals to the internal data bus. For the output mode when data on the internal data bus are transferred to the I/O terminals, the output drivers are activated while the input latches are inactivated. The number of I/O terminals, output drivers, and input latches are all equal to the number of data lines in the internal data bus. Also during the instruction fetch phase, the op-code field and the address mode field of the received instruction are transferred to the instruction register 105 while the address field is transferred to an address data register in the register stack 106. In addition to address data registers the register stack also includes general purpose data registers, data pointer registers, a stack pointer register, and a program counter. The contents of the instruction register are decoded by the instruction decoder which provides a sequence of control signals on its control lines 109. The control lines distribute the control signals to the various functional parts of the CPU.

During the data fetch phase the address(es) of operand(s) are formed in accordance with the address mode field of the instruction. Address formation occurs in the address arithmetic unit (AAU) 110. Address data are first transferred from the register stack via the internal address bus 107 to the temporary registers 111 and 112. The result of the AAU operation is stored in temporary register 113 and subsequently transferred to the address output terminals via the internal address bus and the address output drivers 114. The operand from the external source addressed by the CPU is received by the CPU at the I/O terminals and transferred to the internal data bus for use in a processor operation.

Those processor operations which involve arithmetical or logical manipulations of operands are performed in the arithmetic and logic unit (ALU) 116. For ALU operations, an operand provided to the CPU is first transferred to one of the temporary data registers 117 and 118. The ALU under the control of control signals from the instruction decoder performs a specified operation on the operand(s) stored in the temporary data registers. The result from the ALU operation is first stored in another temporary data register 119 and is subsequently transferred to either the I/O terminals or an internal data register.

To perform functional tests on the prior art CPU of FIG. 1, test vectors are applied to the I/O terminals when the CPU is in its input mode and to all other input terminals which are not shown in FIG. 1. The output patterns from the CPU are observed at the I/O terminals when the CPU is in its output mode, at the address output terminals, and at other output terminals which are not shown in FIG. 1. Because a microprocessor CPU is fabricated on a single integrated circuit chip in which the dimensions of components and signal conductors are extremely small, it is impractical to directly access the functional parts of the CPU. Therefore, the functional parts cannot be tested separately, but may only be tested collectively as one of several component parts along a particular signal path between the input and output terminals of the chip.

For example, suppose an applied test vector includes a bit pattern equivalent to an instruction to perform a particular ALU operation on two specified operands. During the instruction fetch phase the portion of the test vector corresponding to the op-code field and the address mode field are transferred to the instruction decoder. During the operand fetch and data execution phases, the instruction decoder responsive to the contents of the instruction register generates a sequence of four sets of control signal patterns. Because these control signal patterns are not directly observable at the terminals of the CPU chip, the response of the instruction decoder to the particular op-code field and address mode field can only be indirectly observed through the resultant data from the ALU operation itself. The first set of control signal patterns causes the retrieval of a first operand provided to the CPU at its I/O terminals and transfers the first operand to temporary data register 117. The second control signal pattern causes the retrieval of a second operand which is transferred to temporary data register 118. The third control signal pattern causes the ALU to perform the operation specified by the op-code and to transfer the result of the operation to temporary data register 119. The fourth control signal pattern transfers the result to the I/O terminals where it can be observed as an output pattern and compared with a "correct" output pattern.

If a particular logical fault in the instruction decoder in response to the above test vector causes an error in one of the aforementioned control signal patterns and the error affects a functional part (e.g., a general purpose register in the register stack) which is not in the signal path of the operand fetches or the ALU operation, that fault would not produce an erroneous output pattern (i.e., an erroneous result for the ALU operation). In some cases an additional test vector may be found which when subsequently applied would cause the functional part affected by the erroneous control signals to produce an erroneous output pattern, but many potential logical faults in the instruction decoder remain undetectable by present techniques despite additional test vectors. Thus the nonobservability of the control signals in prior art CPUs limits fault coverage and lengthens the sequence of test vectors required to achieve a given fault coverage.

Functional test fault coverage in a CPU chip can be improved and the length of the test program reduced if the CPU includes provisions for making the control signals from the instruction decoder directly observable at the output terminals of the chip. Such provision would permit the instruction decoder to be tested independently of the other functional parts.

Figure 2:
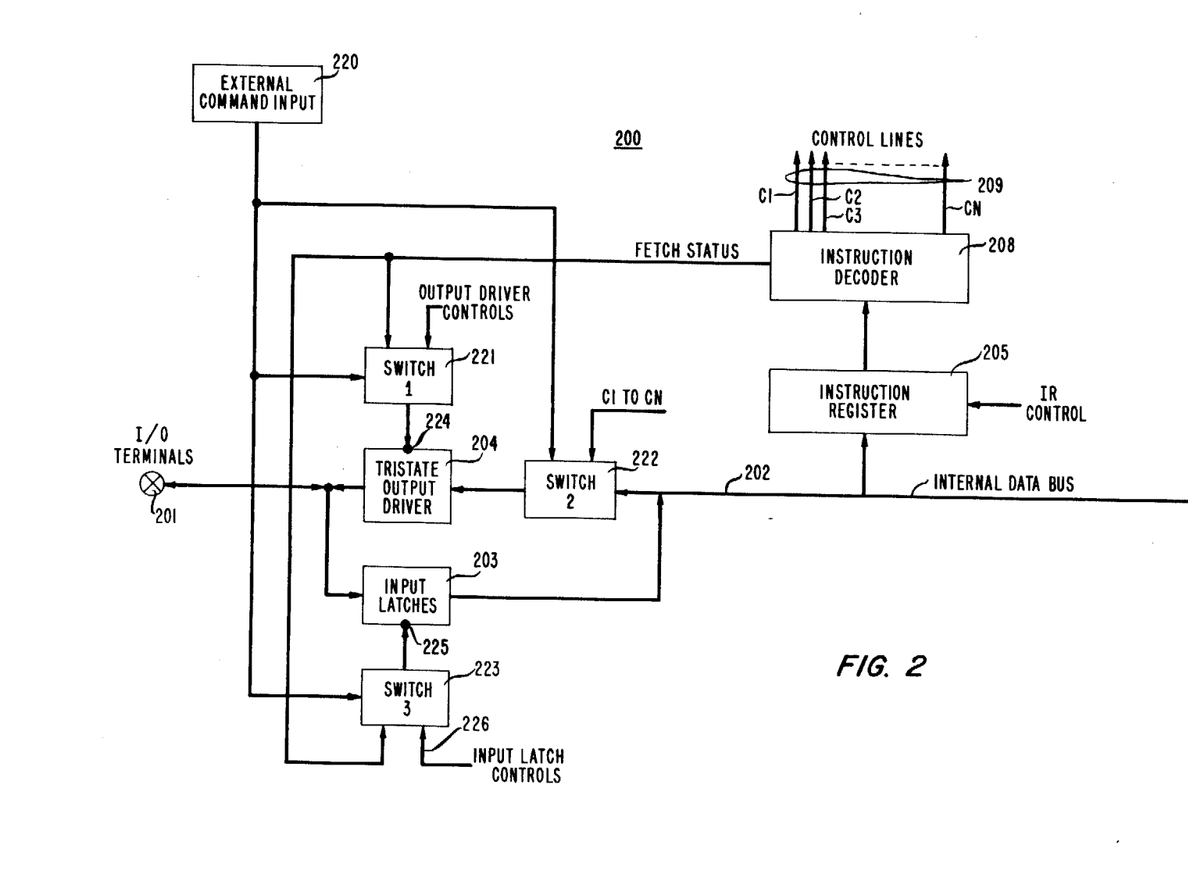
FIG. 2 is a block diagram of one embodiment of a microprocessor CPU in accordance with the present invention.

Referring now to FIG. 2, there is shown a microprocessor CPU similar in some aspects to the CPU of FIG. 1 but including improvements which permit the control signals on the control lines 209 to be directly observable at the I/O terminals 201. Component parts such as the register stack, the ALU, the AAU, the temporary registers, the internal address bus, etc. which are not essential for explaining the improvements have been omitted from FIG. 2. The improvements include switch 222 which, under the control of a command signal applied at the external command input 220, alternatively connects either the internal data bus 202 or the control lines 209 to output drivers 204. The internal data bus is normally connected to the output drivers, but when the command signal is true, the control lines instead are connected to the output drivers. As used herein, "true" and "false" refer to the two states of a binary logic signal. FIG. 2 illustrates the case where the number of control lines and the number of I/O terminals are equal. For the case where the number of control lines exceeds the number of I/O terminals, the excess control lines may, under the control of the command signal, be connected to the address output terminals by including another switch similar to switch 222 between the internal address bus and the address output drivers. The address output terminals, the internal address bus, and the address output buffers which are identical to those shown in FIG. 1 have been omitted in FIG. 2.

Also under the control of the command signal is switch 221 which alternatively provides either the output driver control signals or a fetch status signal to the control input terminal 224 of the output drivers 204. Normally, the control input terminal receives the output driver control signal. However, when the command signal is true, the control input receives a fetch status signal from the instruction decoder. The fetch status signal remains true only during the interval when the contents of the instruction register 205 are being updated. Thus, while the command signal is true, the logic state of the control lines are observable at the I/O terminals throughout the instruction cycle except during the interval when the contents of the instruction register is being updated and the output drivers are in their high impedance state.

The CPU of FIG. 2 also includes switch 223 which under the control of the command signal provides either the normal input latch control signal or the fetch status signal to the control input terminal 225 of the input latch 203. The input latches are normally activated by the input latch control signal on the input latch control line 226. But when the command signal is true, the input latches are activated by the fetch status signal when a new instruction is received at the I/O terminals, and the contents of the instruction register are updated.

Figure 3:
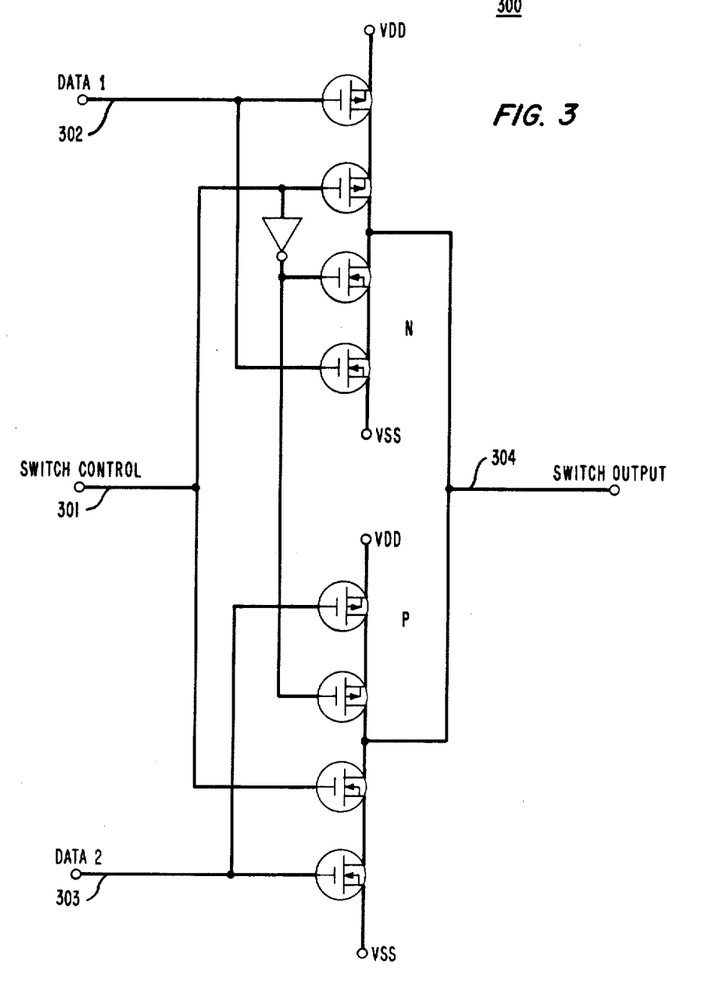
FIG. 3 is a schematic diagram of a CMOS switch circuit useful in the invention.

Referring now to FIG. 3, there is shown a schematic diagram 300 of a suitable form for the switch circuit used in 221, 222, and 223 of the CPU of FIG. 2. When the switch control terminal 301 is at a voltage near the VSS supply voltage (i.e., the "low" logic state) the data1 terminal 302 is effectively connected to the output terminal 304, but when the switch control terminal is at a voltage near the VDD supply voltage (i.e., the "true" logic state) the data1 terminal is effectively disconnected from the output terminal, and the data2 303 terminal is effectively connected to the output terminal. Although the switch circuit as shown in FIG. 3 is implemented in complementary metal-oxide-semiconductor (CMOS) technology, equivalent switching means implemented in other integrated circuit technologies and with other circuit configurations may also be used.

Figure 4:
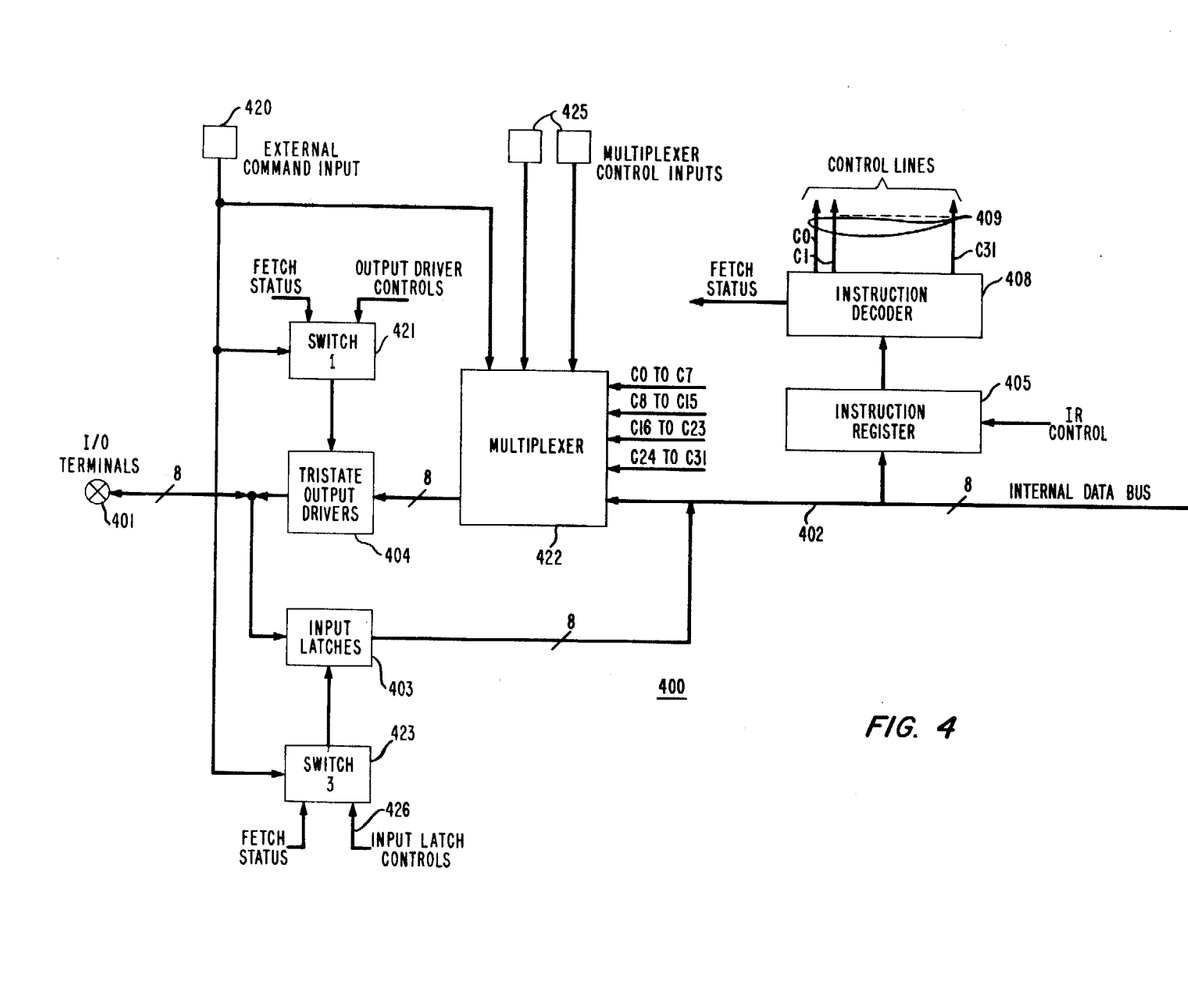
FIG. 4 is a block diagram of another embodiment of a microprocessor CPU in accordance with the present invention, including provisions for multiplexing the control signals onto the output terminals of the chip.

Referring now to FIG. 4, there is shown another embodiment of a microprocessor CPU in accordance with the instant invention. The CPU shown includes provisions for directly observing the control signals on the control lines 409 at the I/O terminals 401 for the case where the number of control lines (in this case, 32) exceeds the combined number of I/O terminals (8) and address output terminals (16). The address formation circuitry for the CPU of FIG. 4 is the same as for the CPU of FIG. 1 and is, for simplicity, omitted in FIG. 4. In the CPU of FIG. 4, the internal address bus is 16-bits wide and is coupled to 16 address output terminals via 16 address output buffers. A multiplexer (MUX) 422 is used to permit the control lines to be coupled to the output terminals eight at a time. The MUX is controlled by a command signal applied to an external command input 420 and by a 2-bit MUX control signal applied to MUX control inputs 425. When the command signal is false, the MUX connects the eight lines of the internal data bus 402 to the output drivers 404. The MUX connects eight of the thirty-two control lines to the output drivers when the command signal is true. The 2-bit MUX control signal selects one of four groups of eight control lines for observation at the I/O terminals. Details of the design of a MUX circuit to perform the above-described function would be obvious to one skilled in the art of digital integrated circuit design and therefore need not be further described. The functions of the other parts of the CPU of FIG. 4 are the same as for the corresponding parts of the CPU of FIG. 2.

Figure 5:
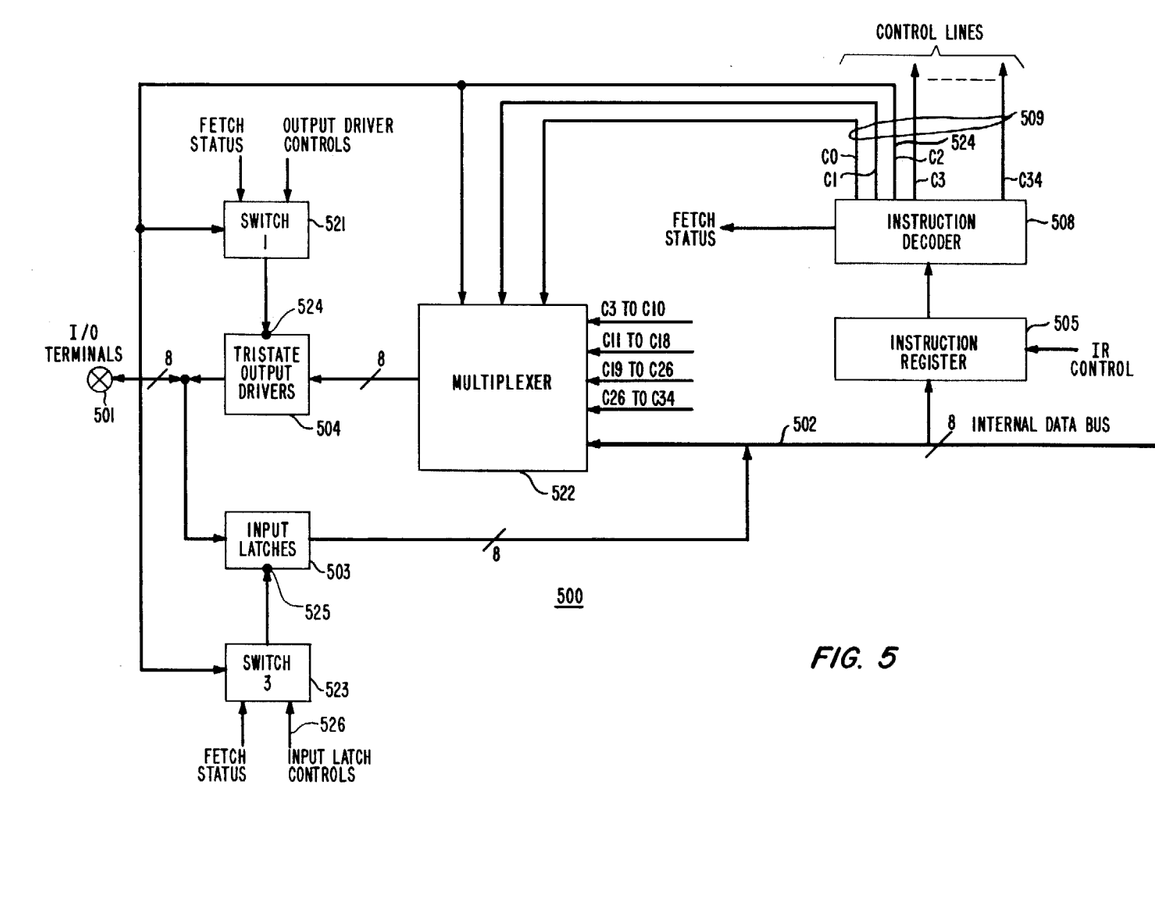
FIG. 5 is a block diagram of still another embodiment of a microprocessor CPU in accordance with the present invention in which the command signal for transferring the control signals to the output terminals are carried by instructions of a special subset.

Referring now to FIG. 5, there is shown another microprocessor CPU in accordance with the instant invention. The CPU shown is similar to that shown in FIG. 4 except that the command signal and the MUX control signals, instead of being supplied externally, are generated by the instruction decoder 508 in response to the binary state of a designated bit position in the instruction register. When that designated bit position is true, the signal on the C2 control line, which serves the same function as the command signal in the CPU of FIG. 4, is also true. At the same time, the instruction decoder generates in sequence the four possible binary states of control lines C0 and C1 which serve the same function as the MUX control signal in the CPU of FIG. 4. Therefore, a logical "1" in the designated bit position in the instructions for the CPU of FIG. 5 serves as an indicium for a special subset of instructions to be used for testing purposes. When an instruction of the special subset is executed by the CPU, the MUX 522 couples control lines C3 to C34 to the output drivers 504 eight at a time in sequence. The indicium for the special subset of instructions may also be a specific prefix to the instruction or a designated group of bit positions in the instruction having a particular binary value. The portion of the instruction decoder which decodes the indicium bit or bits is assumed to be fault free. Since that portion of the instruction decoder performs only a simple function, the chip area occupied by that portion is relatively small. Therefore, the probability of a logic fault caused by a processing defect occurring in that portion is also relatively small.

I claim:

1. A single-chip processor comprising:
a plurality of input/output terminals (e.g., 201);
an internal data bus (e.g., 202);
input latch means (e.g., 203) operatively coupled to the input/output terminals (e.g., 201) and to the internal bus (e.g., 202), said input latch means (e.g., 203) having an input latch control terminal (e.g., 225), whereby said input latch means (e.g., 203) delivers input data to the internal bus (e.g., 202) from said input/output terminals (e.g., 201) when said input latch control terminal (e.g., 225) receives a positive signal;
tristate output driver means (e.g., 204) operatively coupled to the input/output terminals (e.g., 201) and having a plurality of input terminals and a control terminal (e.g., 224);
instruction decoding means (e.g., 208) for fetching at least a portion of an instruction during an instruction cycle and for controlling the execution of one or more processor operations specified by the instruction, the instruction decoder means (e.g., 208) having a multiplicity of control lines, for providing control signals, including
an output driver control line for providing an output driver control signal, an input latch control line (e.g., 226) for providing an input latch control signal, and a fetch status signal line for providing a fetch status signal when the instruction decoding means (e.g., 208) is fetching said at least a portion of an instruction;
test input means (e.g., 220) for delivering a command signal;
first switching means (e.g., 221) responsive to the external command signal and operatively coupled to the fetch status signal line, to the output driver control line, and to the output control terminal (e.g., 224) of the tristate output driver means (e.g., 204), said first switching means being arranged for delivering the fetch status signal to said output control terminal (e.g., 224) of the tristate driver means (e.g., 204) in response to the presence of the command signal but otherwise for delivering the output driver control signal to the control terminal (e.g., 224) of the tristate driver means (e.g., 204);
second switching means (e.g., 222) operatively coupled to the control lines, the internal bus (e.g., 202), and the input terminals of the output driver means (e.g., 204), said second switching means (e.g., 222) being responsive to the command signal and arranged for delivering the control signals from the instruction decoder (e.g., 208) to the plurality of input terminals of the output driver means (e.g., 204) when the command signal is present but otherwise for delivering bus data from the internal data bus (e.g., 202) to the said plurality of input terminals of the output driver means (e.g., 204), whereby said tristate driver (e.g., 204) delivers the bus data from the second switching means (e.g., 222) to the input/output terminals (e.g., 201) when the command signal is absent provided that the output driver control signal is present, and whereby when the command signal is present said tristate driver means (e.g., 204) delivers the control signals from the second switching means (e.g., 222) to said input/output terminals provided that the fetch status signal is then absent but puts said tristate driver (e.g., 204) into its high impedance state with respect to said input/output terminals (e.g., 201) provided that the fetch status signal is then present; and third switching means (e.g., 223) operatively coupled to the fetch status signal line, to the input latch control line (e.g., 226), and to the input latch control terminal (e.g., 225) of the input latch means (e.g., 203), said third switching means (e.g., 223) being responsive to the command signal and arranged for delivering the fetch status signal to said input latch control terminal (e.g., 225) when said command signal is present and otherwise for delivering the input latch control signal to the input latch control terminal (e.g., 225), whereby the input latch control terminal (e.g., 225) receives said positive signal from said switching means (e.g., 223) when the command signal is absent provided that the input latch control signal is then present and also receives said positive signal when the command signal is present provided that the fetch status signal is then present.

2. The processor recited in claim 1 wherein the number of the multiplicity of control lines exceeds the number of the plurality of input terminals of the tristate output driver means (e.g., 204) and wherein the second switching means (e.g., 222) comprises multiplex means (e.g., 422) for multiplexing the control signals on the control lines onto the plurality of input terminals of the tristate output driver means (e.g., 204).

3. A single-chip processor comprising:

a plurality of input/output terminals (e.g., 501);

an internal data bus (e.g., 502);

input latch means (e.g., 503) operatively coupled to the input/output terminals (e.g., 501) and to the internal bus (e.g., 502), said input latch means (e.g., 503) having an input latch control terminal (e.g., 525) whereby said input latch means (e.g., 503) delivers input data to the internal bus (e.g., 502) from said input/output terminals (e.g., 501) when said input latch control terminal (e.g., 525) receives a positive signal;

tristate output driver means (e.g., 504) operatively coupled to the input/output terminals (e.g., 501) and having a plurality of input terminals and a control terminal (e.g., 524);

instruction decoding means (e.g., 508) for fetching at least a portion of an instruction during an instruction cycle and for controlling the execution of one or more processor operations specified by the instruction, the instruction decoder means (e.g., 508) having a multiplicity of control lines emanating therefrom for providing control signals including an output driver control line for providing an output driver control signal, an input latch control line (e.g., 526) for providing a second input latch control signal, a fetch status signal line for providing a fetch status signal when the instruction decoding means is fetching said portion of an instruction, and a command control line for providing a command control signal when any one of a particular subset of instructions is fetched by the instruction decoding means;

first switching means (e.g., 521) responsive to the command signal and operatively coupled to the fetch status signal line, to the output drive control line, and to the output control terminal (e.g., 524) of the output means, said first switching means arranged for delivering the fetch status signal to the input latch control terminal (e.g., 525) when the command signal is present and otherwise for delivering the output driver control signal to the control terminal (e.g., 524) of the tristate driver means (e.g., 504);

second switching means (e.g., 522) operatively coupled to the control lines, the internal bus (e.g., 502), and the input terminals of the output driver means (e.g., 504), said second switching means (e.g., 522) being responsive to the command control signal and arranged for delivering the other control signals from the instruction decoder (e.g., 508) to the plurality of terminals of the output driver means (e.g., 504) when the command signal is present but for delivering bus data from the internal data bus (e.g., 502) to the said plurality of input terminals of the output driver means (e.g., 504) when the command signal is absent, whereby said tristate driver (e.g., 504) delivers the bus data from the second switching means to the input/output terminals (e.g., 501) when the command control signal is absent in the presence of the driver control signal, and whereby in response to the presence of the command control signal said tristate output driver means (e.g., 504) delivers said other control signals from the second switching means (e.g., 522) to said input/output terminals (e.g., 501) provided that the fetch status signal is then absent but puts said tristate driver (e.g., 504) into its high impedance state with respect to said input/output terminals (e.g., 501) provided that the fetch status signal is then present; and third switching means (e.g., 523) operatively coupled to the fetch status signal line, to the input latch control line (e.g., 526), and to the input latch control terminal (e.g., 525) of the input latch means (e.g., 503), said third switching means (e.g., 523) being responsive to the command signal and arranged for delivering the fetch status signal to said input latch control terminal (e.g., 525) when the command signal is present but otherwise for delivering the input latch control signal to the input control terminal (e.g., 525), whereby the input latch terminal (e.g., 525) receives said positive signal from said third switching means (e.g., 523) when the command signal is absent provided that the input latch control signal is then present and also receives said positive signal when the command signal is present provided that the fetch status signal is then present.

4. The processor recited in claim 3 wherein the number of the multiplicity control lines exceeds the number of the plurality of input terminals of the tristate output driver means (e.g., 504) and wherein the second switching means (e.g., 522) includes means for multiplexing said other control signals on the control lines onto the plurality of input terminals of the tristate output driver means (e.g., 504).

5. A processing unit comprising:

(a) an input latch having an input latch control terminal for receiving a first input latch control signal to activate the latch;

(b) a tristate output driver having a tristate control terminal for receiving a first tristate driver control signal to place the tristate driver into its high impedance state;

(c) input/output terminals for delivering input instruction and operand data signals to the input latch and for receiving output data signals from the tristate output driver;

(d) an instruction decoder for producing a plurality of decoded control signals including a fetch status signal, a second tristate driver control signal, and a second input latch control signal;
(e) an internal data bus arranged for delivering the output data signals to a second switch and for delivering the input instruction data signals from the input latch to the instruction decoder;
(f) a first switch, controlled by a command signal, arranged for delivering the first tristate driver control signal to the tristate control terminal: (1) in response to the second tristate driver control signal from the instruction decoder in the absence of the command signal, and (2) in response to the fetch status signal in the presence of the command signal;
(g) the second switch, controlled by the command signal, arranged for delivering to the tristate output driver: (1) the output data signals from the internal data bus when the command signal is absent, and (2) the decoded control signals from the instruction decoder when the command signal is present; and
(h) a third switch, controlled by the command signal, arranged for delivering the first input latch control signal to the input latch control terminal: (1) in response to the fetch status signal in the presence of the command signal, and (2) in response to the second input latch control signal from the instruction decoder in the absence of the command signal.

6. The processing unit of claim 5 in which the instruction decoder is arranged for producing the command signal.

* * * * *

UNITED STATES PATENT AND TRADEMARK OFFICE
CERTIFICATE OF CORRECTION

PATENT NO. : 4,422,141

DATED : December 20, 1983

INVENTOR(S) : Masakazu Shoji

It is certified that error appears in the above-identified patent and that said Letters Patent is hereby corrected as shown below:

Column 9, line 62, "drive" should read --driver--.

Signed and Sealed this

Fifth Day of June 1984

[SEAL]

Attest:

GERALD J. MOSSINGHOFF

Attesting Officer — Commissioner of Patents and Trademarks